US011170117B2

(12) United States Patent
Jha (10) Patent No.: US 11,170,117 B2
(45) Date of Patent: Nov. 9, 2021

(54) RAPID CONTENT DEPLOYMENT ON A PUBLICATION PLATFORM

(71) Applicant: BMC Software, Inc., Houston, TX (US)

(72) Inventor: Ashish Kumar Jha, Pune (IN)

(73) Assignee: BMC Software, Inc., Houston, TX (US)

( * ) Notice: Subject to any disclaimer, the term of this patent is extended or adjusted under 35 U.S.C. 154(b) by 308 days.

(21) Appl. No.: 16/411,551

(22) Filed: May 14, 2019

(65) Prior Publication Data

US 2019/0377888 A1    Dec. 12, 2019

(30) Foreign Application Priority Data

Jun. 8, 2018   (IN) .............................. 201841021597

(51) Int. Cl.
| | |
|---|---|
| G06F 21/60 | (2013.01) |
| H04L 29/06 | (2006.01) |
| G06F 21/62 | (2013.01) |
| H04L 29/08 | (2006.01) |
| G06F 16/958 | (2019.01) |

(52) U.S. Cl.
CPC .......... *G06F 21/604* (2013.01); *G06F 16/958* (2019.01); *G06F 21/6218* (2013.01); *H04L 63/101* (2013.01); *H04L 67/26* (2013.01)

(58) Field of Classification Search
CPC .. G06F 21/604; G06F 16/958; G06F 21/6218; H04L 63/101; H04L 67/26
See application file for complete search history.

(56) References Cited

U.S. PATENT DOCUMENTS

| | | | |
|---|---|---|---|
| 7,885,929 | B2 | 2/2011 | Moore, Jr. et al. |
| 8,495,663 | B2 | 7/2013 | Tien et al. |
| 9,225,786 | B1 | 12/2015 | Ebert |
| 9,253,176 | B2 | 2/2016 | Ford et al. |

(Continued)

OTHER PUBLICATIONS

Amon: "Google Cloud Datalab vs. Anaconda Cloud vs Domino Datalab", retried from https://medium.com/@louis_amon/google-cloud-datalab-vs-anaconda-cloud-vs-domino-datalab-4129114148e0, Aug. 3, 2016, 10 pages.

(Continued)

*Primary Examiner* — Arvin Eskandarnia
(74) *Attorney, Agent, or Firm* — Brake Hughes Bellermann LLP (57) ABSTRACT

A system for rapid deployment of content on a common publication platform. The system includes a rapid content deployment application hosted on a stand-alone or networked computer that is interfaced with the common publication platform. The rapid content deployment application includes a receiver to receive a file for publication on the common publication platform, a file existence checker to verify existence of a collaboration file on the common publication platform compatible with the received file, and a file preparer to prepare the received file for uploading to the common publication platform in compliance with one or more of governance, security, and change management policies including access control and authorization policies. The rapid content deployment application further includes a file uploader to upload the prepared file to the common publication platform for publication.

27 Claims, 5 Drawing Sheets

(56) References Cited

U.S. PATENT DOCUMENTS

| | | |
|---|---|---|
| 9,916,157 B2 | 3/2018 | Geng et al. |
| 2005/0144096 A1 | 6/2005 | Caramanna, II et al. |
| 2008/0192736 A1* | 8/2008 | Jabri .................... G11B 27/034 370/352 |
| 2010/0088522 A1* | 4/2010 | Barrus .................. H04L 9/3242 713/181 |
| 2015/0120604 A1 | 4/2015 | Xu et al. |
| 2016/0162814 A1 | 6/2016 | Breedvelt-Schouten et al. |
| 2017/0116202 A1 | 4/2017 | Pattabhiraman et al. |
| 2017/0178266 A1 | 6/2017 | Schmidt |
| 2017/0206217 A1 | 7/2017 | Deshpande et al. |

OTHER PUBLICATIONS

Carto Builder: "Intuitive Analysis for Predicting Key Insights", retrieved from https://carto.com/builder/ on May 11, 2018, 8 pages.
Datawrapper: "Enrich your stories with charts, in seconds", retrieved from https://www.datawrapper.de/ on May 11, 2018, 10 pages.
Tableau Public: "Data In. Brilliance Out." retrieved from https://public.tableau.com/s/ on May 11, 2018, 5 pages.

* cited by examiner

RAPID CONTENT DEPLOYMENT ON A PUBLICATION PLATFORM

CROSS-REFERENCE TO RELATED APPLICATION

This application claims priority to and the benefit of INDIA Provisional Patent Application No. 201841021597, filed Jun. 8, 2018, entitled "Rapid Content Deployment On a Publication Platform", which is hereby incorporated by reference in its entirety herein.

BACKGROUND

Content publishing software (e.g., third-party Tableau Server) is used to "publish" data (e.g., business intelligence reports, spreadsheets, workbooks, etc.) on a common collaboration or publication platform (hereinafter "publication platform") to be shared between users (e.g., personnel, teams, and departments) in an organization. The common publication platform, which may be hosted on a computer network or the cloud, may enable collaboration between users in real time. A publisher (e.g., team member) may, for example, connect to any data source—whether on-premise or in the cloud—to the common publication platform (e.g., Tableau Server), and share the data source as a live connection or an extract for others (e.g., other team members) to see. The publisher may, for example, publish (or deploy) a file (e.g., a spreadsheet or workbook) on the common publication platform in a common workspace for other collaborators (e.g., other team members) to look at, edit, or supplement.

The common publication platform (e.g., Tableau Server) may have its own governance model under which a subset of properly trained users can handle a vetting process to approve content and promote it to the production folders within their business units. The governance model of the publication platform may not be co-extensive with the organization's governance, security, and change management policies. At present, each new publication, or change to a publication, (e.g., in a common workspace) on the common publication platform requires manual administrative intervention to ensure compliance with the organization's governance, security, and change management policies (including access control and authorization policies). The need for manual administrative intervention introduces delays in publication that makes timely content sharing on content publishing software such as, for example, Tableau Server, difficult or impossible.

Consideration is now given for systems and techniques for rapid content deployment on a common publication platform consistent with an organization's governance, security, and change management policies.

SUMMARY

A system for automated rapid deployment of content on a common publication platform includes a rapid content deployment application hosted on a computer that is interfaced with the common publication platform. The rapid content deployment application includes a receiver to receive a file for publication on the common publication platform, a file existence checker to verify existence of a collaboration file on the common publication platform compatible with the file for publication, and a file preparer to prepare the file for uploading to the common publication platform in compliance with one or more of governance, security, and change management policies. The rapid content deployment application further includes a file uploader to upload the file to the common publication platform for publication.

BRIEF DESCRIPTION OF THE DRAWINGS

Like reference symbols in the various drawings indicate like elements.

DETAILED DESCRIPTION

Systems and methods for rapid deployment of content on a common collaboration or publication platform ("publication platform") are disclosed herein. The content may be presented for publication by multiple users/collaborators ("publishers") in an organization. The systems and methods can automate processes for deployment of the content presented for publication on the common publication platform, without manual intervention (e.g., by administrators), in compliance with the organization's governance, security, and change management policies.

The publication platform may be, for example, a third-party provided software hosted on a computer network or hosted in the cloud. For purposes of illustration herein, the third-party provided software may, for example, be the web-based collaboration or publication platform "Tableau Server," which is commercially available as a collaborative data visualization platform from Tableau Software, Seattle, Wash. Tableau Server may be installed on a Windows server and may be accessible to users via a browser. The Tableau Server lets the organization's administrators manually manage collaboration, security and performance.

The systems and methods described herein involve a rapid content deployment (RCD) application (App), which automates change management processes for content published on the platform (i.e., publishing, re-publishing, sharing and administrating content) while ensuring compliance with the organization's governance, security, and change management policies in a matter of minutes. The organization's governance, security, and change management policies may be implemented, for example, using access control and authorization mechanisms. In an example implementation, the organization's governance, security, and change management policies (including access control and authorization policies) may be coded, for example, in an access control list (ACL) used by the RCD App to implement those policies.

A file drop-and-drag event by a user (publisher) on a client device can initiate a publication request (e.g., by uploading or transmitting a file for publication) on the Tableau Server. Other types of events also may initiate the publication request. The file can be any of various file types (e.g., Tableau file types with extensions—.TWBX, .TDSX, .TDS, .TWB, etc.). Multiple users may be uploading different files for publication at the same time. Event listeners monitor file drop events that initiate the publication processes. A buffer memory process manages memory so that all incoming events are recorded and processed efficiently. Completion of file transmission of the file uploaded for publication is monitored. An access control list (ACL) of the file uploaded for publication is captured in code (e.g., PowerShell code or script). A REST API is used check if a collaboration file (of a compatible file type), which would be edited, modified, or supplemented by the file uploaded for publication, exists on the publication platform.

After a publication request is received, the RCD App may begin processes to notify the user (publisher) at each stage of the publication process using, for example, the ACL to verify that that publishing the uploaded file will conform to the organization's governance, security, and change management policies. The processes for notification may, for example, include:

a. If the collaboration file (and file type) does not exist on the platform, the user is notified of an unauthorized file.
b. If the collaboration file (and file type) do exist on the platform, the user is notified of publication process start.
c. If the file for publication is a data source, the file is uploaded to the platform using a REST API or command line, and the user is notified by e-mail or other communication means. Data source refresh is invoked in a parallel process, and the user is notified by e-mail on refresh completion.
d. If the file for publication is a workbook (e.g., containing a .twb-type XML document, or a .twbx-type "zipped" package of a .twb file, a data source file (TDE type), and any other file used to produce the workbook (including images)), worksheets (e.g., work-in-progress sheets, or preparation notes) of the workbook that should be hidden (e.g., not to be shared with collaborators) are tagged with a searchable keyword. These worksheets marked with the keyword are removed from the workbook using, for example, an XML parser. The remainder workbook is uploaded to the platform using REST API/command line, and the publisher is notified by e-mail.

In an example implementation, the RCD App is configured to parse a file (e.g., a workbook) submitted for publication to identify content (e.g., worksheets) marked with a searchable keyword or tag as content to be hidden (e.g., to hide cell data or prevent changes to formulas). The RCD App extracts such marked content and publishes only portions of the file that are not marked as content to be hidden.

Figure 1A:
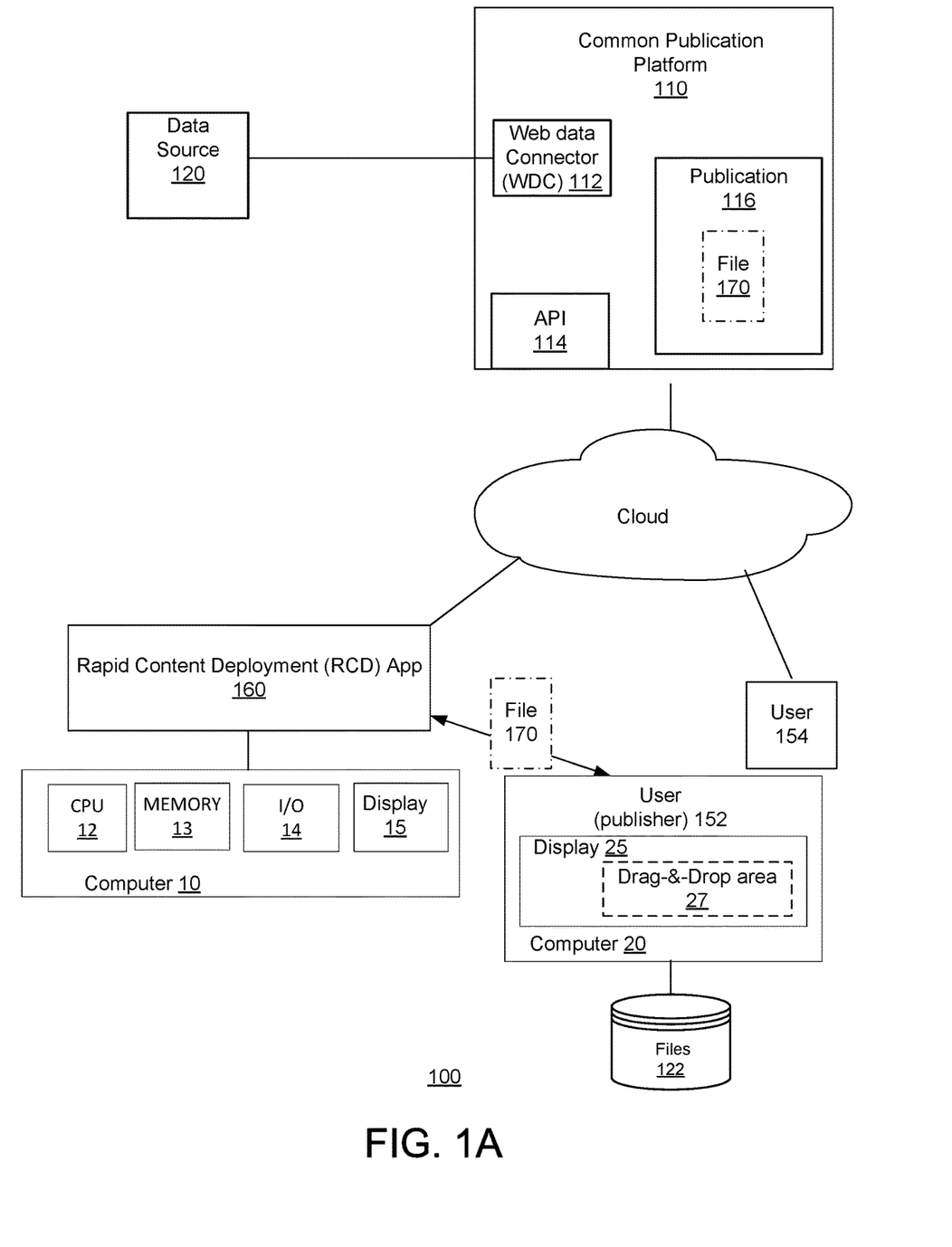
FIG. 1A is a schematic illustration of an example system for rapid deployment of content on a common publication platform, in accordance with the principles of the present disclosure.

FIG. 1A shows an example system 100 for rapid deployment of content presented by users for publication on a common publication platform 110, in accordance with the principles of the present disclosure.

In an example implementation, system 100 includes a Rapid Content Deployment (RCD) App 160 hosted on a computer 10 (e.g., a stand-alone or networked computer, or a main frame computer), which, for example, can include a CPU 12, a memory 13, an I/O 14 and a display 15. RCD App 160 may be integrated or interfaced with processes of common publication platform 110, and interfaced with computing devices (e.g., computing device 20) that one or more users (e.g., user 152, user 154, etc.) may use to access common publication platform 110. RCD App 160 may supervise the access to common publication platform 110 by the one or more users who may, for example, seek to view, share, edit, or modify content on common publication platform 110. For example, a user 152 may seek to upload a file (e.g., file 170) from computing device 20 for publication on common publication platform 110. RCD App 160 may supervise the publication of file 170 uploaded from computing device 20 on common publication platform 110.

RCD App 160 is configured to automate publication processes while ensuring compliance with the organization's governance, security, and change management policies, in accordance with the principles of the present disclosure.

In an example implementation, RCD App 160 may be configured to parse a workbook submitted for publication, identify a worksheet (in the workbook) that is marked by a searchable keyword or tag as a worksheet that should be hidden, extract the marked worksheet, and publish only the worksheets (in the workbook) that are not marked with the keyword or tag as worksheets that should be hidden.

In system 100, common publication platform 110 may, for example, be a collaborative data visualization platform such as Tableau Server. Common publication platform 110 may be hosted on an on-premise server, a server on a computer network, or a server in the cloud. Common publication platform 110 may, for example, be configured to allow users (e.g., user 152, user 154, etc.) to collaborate via content published (e.g., publication 116) on common publication platform 110. Common publication platform 110 may include a web data connector (WDC) 112 to connect to one or more data sources (e.g. data source 120), and also include one or more application programming interfaces (APIs) (e.g., REST API 114) through which administrators can manage and change platform resources programmatically, using hypertext transfer protocol (HTTP). A representational state transfer (REST) API 114 may give access to the functionality behind the data sources, projects, workbooks, site users, and sites on common publication platform 110. An administrator may access REST API 114 to create custom applications or to script interactions with the resources of common publication platform 110.

The users may access common publication platform 110 and data sources (e.g., data sources 120, 122) via local computing devices (e.g., user 152 may access common publication platform 110 and data sources 120, 122 via computing device 20).

Computing device 20 may include a CPU, a memory, and an I/O (not shown), and a display 25. User 152 may, for example, prepare file 170 on computing device 20 (e.g., using data from data sources 122, 120) for publication on the common publication platform 110 and for sharing with other users (e.g. user 154). For visual clarity in the figures and simplicity in description, a computing device that another user (e.g., user 154) may use to access common publication platform 110 is neither shown in FIG. 1A nor described further herein. In an example implementation, user 152 may drag and drop (or otherwise upload) file 170 in a drag-and-drop icon or area 27 of display 25 on computing device 20 to initiate publication processes by RCD App 160. Alternatively, other forms of communication (e.g., command line, e-mail, etc.) may be used to send or identify file 170 to RCD App 160 to initiate the publication processes for publication of content (e.g., file 170) on common publication platform 110.

Figure 1B:
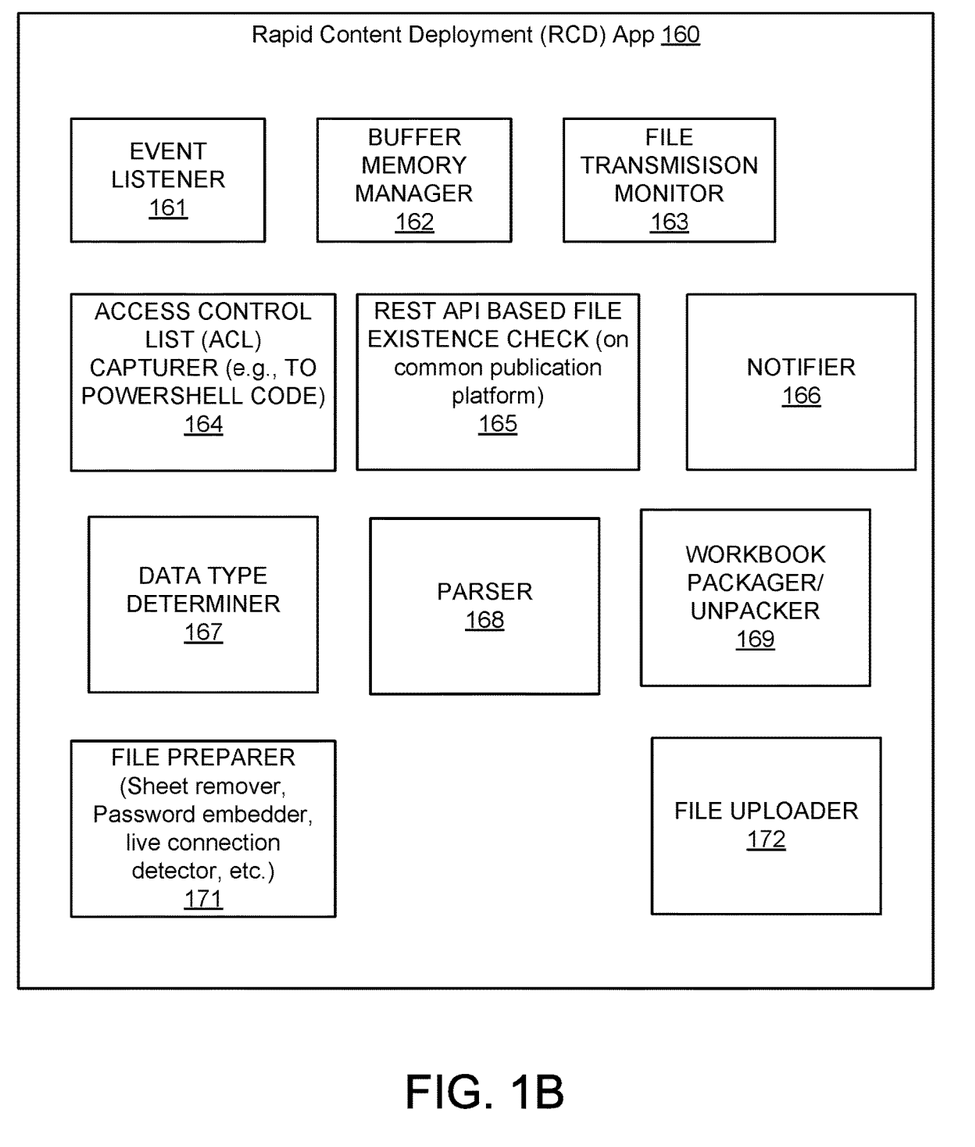
FIG. 1B is a schematic illustration of example components of a Rapid Content deployment App that is involved in content publication processes, in accordance with the principles of the present disclosure.

FIG. 1B shows example components of RCD App 160 that may be involved in content publication processes. RCD App 160 may, for example, include a file uploader 172 coupled to an event listener 161, a buffer memory manager 162, and a file transmission monitor 163. Event listener 161 may be configured to record events (e.g., drag and drop events in area 27) signaling submission of content (e.g., file 170) by a user for publication. Buffer memory manager 162 may manage temporary storage of content (e.g., which can be large in size) submitted for publication, for example, by multiple users (users 152, 154, etc.). The temporary storage of content may be in an allocated buffer memory (not shown), which, for example, is in caches associated with CPU 12 or in memory 13. Buffer memory manager 162 may keep the allocated buffer memory clean so all events signaling submission of content for publication are recorded and processed effectively.

File transmission monitor 163 may be configured to monitor transmission of content (e.g., file 170) uploaded from computing device 20 to common publication platform 110.

RCD App 160 may include a notifier 166, which may after each step (or after one or more steps) of the publication process notify the user (e.g., user 152) of the status of the publication process. Notifier 166 may, for example, send a status e-mail (or other message) to user 152 on receipt of file 170 and after file 170 is transmitted to common publication platform 110.

RCD App 160 may further include an ACL capturer 164 and a file existence checker 165. ACL capturer 164 may be configured to capture ACL parameters (e.g., collaborators such as user 152 intended to have access to file 170) and place the ACL parameters, for example, in a PowerShell code or script for execution on common publication platform 110. File existence checker 165, which, for example, may be based on a REST API, may be configured to check the existence of a collaboration file (e.g., a shared group or project file such as publication 116) on common publication platform 110 that user 152 is authorized to edit, modify, or supplement using, for example, file 170. If such an authorized collaboration file (e.g., publication 116) does not exist, notifier 166 may notify user 152 (e.g., by e-mail) that an authorized collaboration file does not presently exist.

RCD App 160 further includes a data type determiner 167, a parser 168, a workbook packager/unpacker 169, a file preparer 171, and a file uploader 172.

Data type determiner 167 may be configured to determine a data type (e.g., workbook, worksheet, data source, etc.) of file 170. Parser 168 may be configured to parse file 170 (e.g., a workbook into individual work sheets) and to identify keywords or tags in file 170 content. In an example implementation, some individual work sheets or content in file 170 may not be intended for publication or collaborative sharing. Such "not-to-be published" worksheets or content may be marked with searchable keywords or tags (e.g., "Hide") in file 170.

Figure 2:
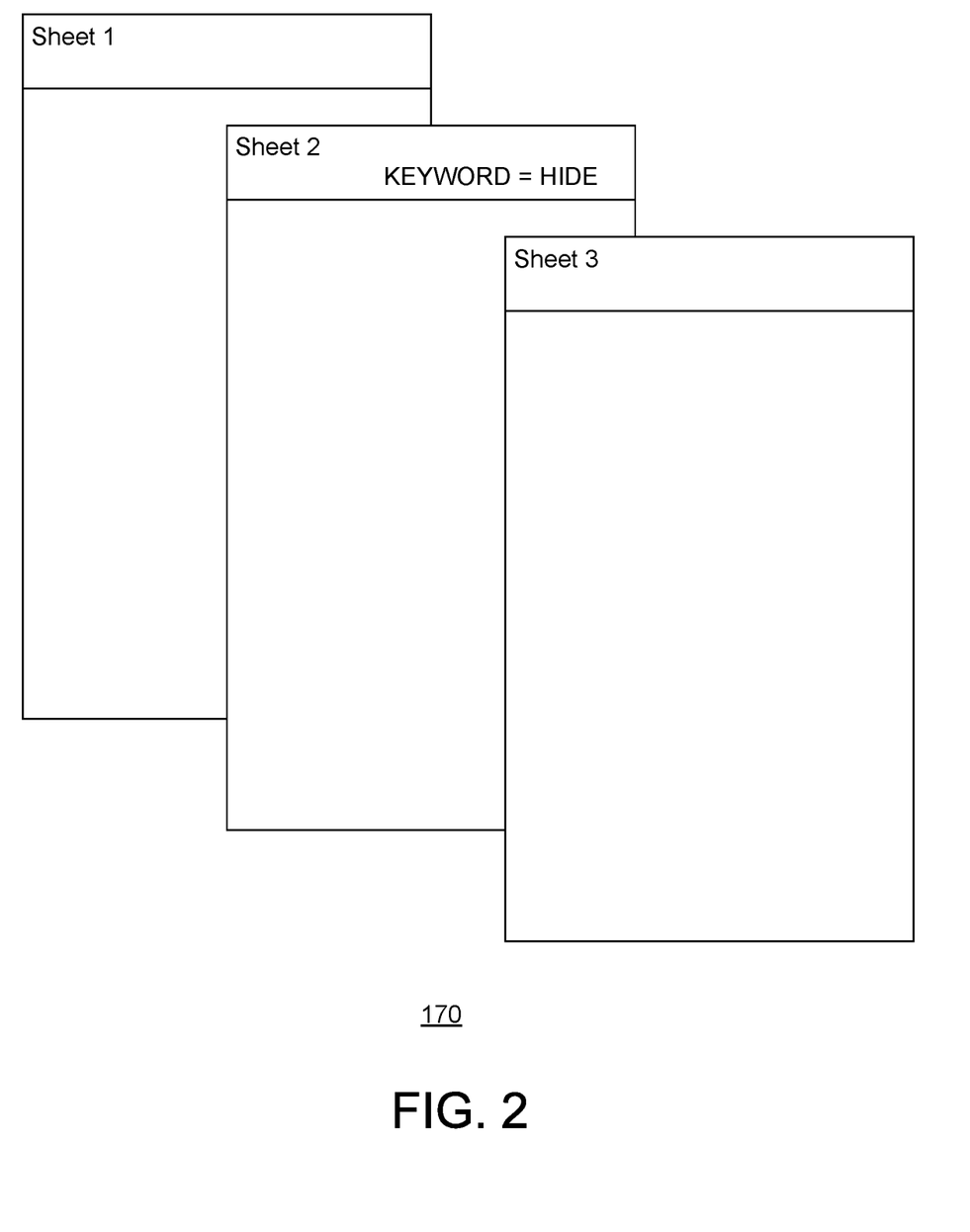
FIG. 2 is a schematic illustration of an example file (e.g., a workbook made of a plurality of worksheets) with a worksheet including a searchable keyword indicating that the worksheet should not be published, in accordance with the principles of the present disclosure.

FIG. 2 shows, for example, an example file 170 with three worksheets (e.g., Sheet 1, Sheet 2 and Sheet 3). As shown in the figure, Sheet 2 may include a searchable keyword (e.g., keyword="Hide") to indicate that Sheet 2 is not intended to be published or shared with other collaborators (e.g. user 154) on common publication platform 110.

With renewed reference to FIG. 1B, parser 168 may identify such "not-to-be published" worksheets or content in file 170 based on the associated keywords or tags (e.g., "Hide"). File 170 (e.g., workbook) may be submitted as a zipped file (e.g., a packaged workbook (.twbx)). Workbook packager/unpacker 169 may be configured to unzip file 170 to extract, for example, individual worksheets for processing (e.g., by parser 168) and, conversely, zip content (e.g., to-be-published worksheets) in a packaged workbook.

File preparer 171 may be configured to prepare file 170 for uploading to common publication platform 110 (by file uploader 172) after it has been processed by other components of RCD App 160. File preparer 171 may, for example, prepare file 170 for uploading by removing worksheets that have been marked or tagged (e.g., using tag "Hide") as do not publish. File preparer 171 may further, for example, exclude any work in progress content in file 170.

File preparer 171 may issue warnings, for example, if existing content in file 170 is refreshable and the dropped content is non refreshable. File preparer 171 may also issue warnings, for example, if data sources in file 170 have a live connection stream.

File preparer 171 may embed passwords for workbooks and datasources in file 170 to be uploaded to common publication platform 110. File preparer 171 may check if the connecting datasources of file 170 (e.g., a .twbx workbook) are all in production for content security control.

Figure 3:
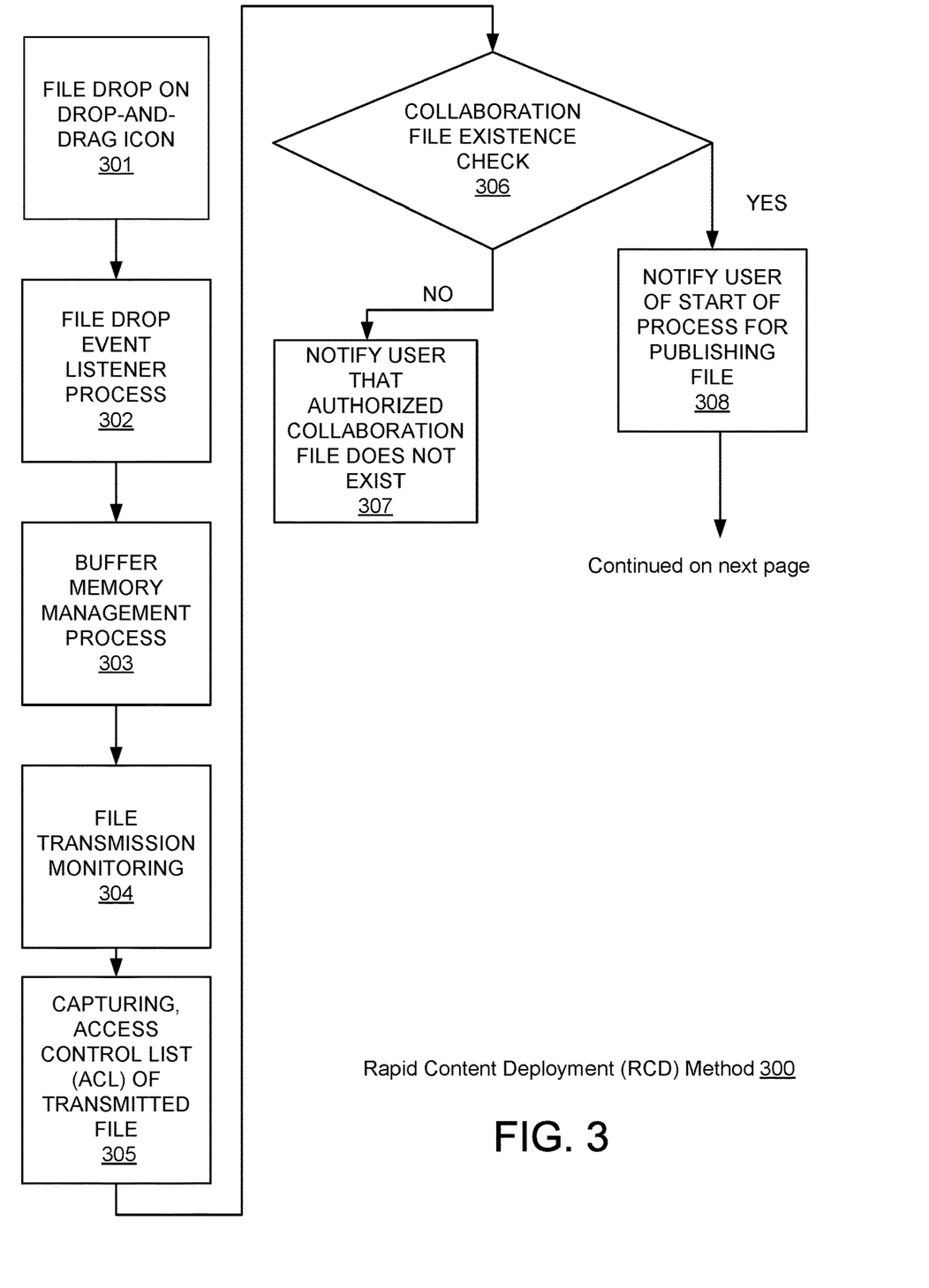
FIG. 3 is an illustration a rapid content deployment method, in accordance with the principles of the present disclosure.

RCD App 160 and its various components may be configured to conduct publication transactions for common publication platform 110 (e.g., a Tableau Server). A proper Tableau Server publication transaction conducted by RCD App 160 may, for example, include:

1) Workbook/datasources password embedding
2) Datasource successfully refreshing
3) Content publication
4) User (publisher) notification
5) Publishing the correct content/exclude any work-in-progress content
6) Warning if existing content is refreshable and the dropped content is non-refreshable
7) Checking if the content exists on the server before publication
8) Recording logs of the transaction
9) Warning if data sources have live connection stream
10) Checking if the connecting datasources of the workbook are all in production for content security control
11) Sending platform success and error logs to the users FIG. 3 shows example steps of a rapid content deployment (RCD) method 300. RCD method 300 may, for example, be implemented by RCD App 160 (which is hosted, for example, on computer 10 in system 100) to publish or republish files (e.g., file 170) on a publication platform (e.g., common publication platform 110).

RCD method 300 may begin with a user (e.g., user 152) initiating a publication request by dragging and dropping file 170 on a drop-and-drag icon (301) and with a file drop event listener process (302) recognizing the publication request.

RCD method 300 may further include a buffer memory management process 303 that may clean the allocated buffer memory of the processor so that all events coming through the RCD process are recorded and processed effectively. Buffer memory management process 303 may implement, for example, a buffer memory workflow to dynamically maintain an optimum balance between job processing and memory management. This balance may keep the RCD processes alive during disruptions such as network outage during file transmission from the user end, etc.

RCD method 300 further includes monitoring file transmission (304), and capturing the ACL of the transmitted file (e.g., file 170) to accompany the file when sent to the common publication platform 110 for publication (305). In example implementations, monitoring file transmission 304 may include determining completion of a file transmission, and capturing the ACL of the transmitted file 305 may include capturing the ACL, for example, in PowerShell code or script.

RCD method 300 further includes a collaboration file existence check (306). Collaboration file existence check 306 may determine whether an authorized collaboration file (e.g., a shared group or project file such as publication 116) exists on common publication platform 110 that user 152 is authorized to edit, modify, or supplement by publishing file 170. If such an authorized collaboration file (e.g., publication 116) does not exist, RCD method 300 may include notifying the user that an authorized collaboration file does not exist (307). In example implementations, at step 307 of RCD method 300, notifier 166 may notify the user, for example, by e-mail, that that an authorized collaboration file for publishing file 170 does not presently exist on common publication platform 110. Conversely, if such an authorized collaboration file (e.g., publication 116) does exist, RCD method 300 may initiate a publication process for publishing file 170 on common publication platform 110. RCD method 300 may include notifying the user of a start of the publication process for publishing the file (e.g. file 170) on common publication platform 110 (308). RCD method 300 may use the ACL for file 170 to identify the user presenting file 170 for publication as the user to whom the notifications are sent at either step 307 or step 308.

As a preliminary to the publication process placing file 170 on the publication platform, RCD method 300 may include determining the data type of file 170 (309). At step 309, RCD method 300 may, for example, determine if file 170 a workbook, a datasource, or a different type of file.

If file 170 is determined to be a datasource, RCD method 300 may include uploading file 170 to publication platform 110 (using, e.g., a REST API command line) (310), and sending a notification (e.g., by e-mail) to the user of the upload of the file (311). RCD method 300 may further include invoking a datasource refresh job on the publication platform in a parallel process (312), and sending a notification (e.g., by e-mail) to the user upon completion of a final refresh of the uploaded datasource (313).

If file 170 is determined to be a workbook, RCD method 300 may include further determining if file 170 is a .twb-type workbook, or a .twbx-type packaged workbook (314).

If file 170 is a .twb-type workbook, RCD method 300 may include parsing the .twb-type workbook and removing worksheets from the file that have been marked of otherwise identified as being hidden or not to be published (315). In an example implementation, the parsing at 315 may involve use of, for example, a XML parser.

If file 170 is a .twbx-type packaged workbook (e.g., a zipped file), RCD method 300 may include unpackaging the file to separate workbook content (e.g., worksheets) from other content (e.g., .tde-type data extracts, images, or geocoding information, etc.) using an unpackage/repackage function 316. RCD method 300 may further include parsing the unpackaged workbook and removing worksheets from the file that have been marked or otherwise identified as being hidden or not to be published (in the same manner as the parsing of a .twb-type workbook at 315) and repackaging the file (having worksheets removed) using the unpackage/repackage function 316.

RCD method 300 may include uploading file 170 (i.e., either the .twb-type file, or the repackaged .twbx-type file, with hidden worksheets removed) to publication platform 110 (317). Uploading file 170 to publication platform 110 may involve using, for example, a REST API command line. RCD method 300 may further include sending a notification (e.g., by e-mail) to the user of the upload of the file (318).

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system for rapid deployment of content on a common publication platform, the system comprising:
   a rapid content deployment application (RCD App) hosted on a computer that is interfaced with the common publication platform, the RCD App including:
   a receiver configured to receive a file for publication on the common publication platform;
   a file existence checker configured to verify existence of a collaboration file on the common publication platform compatible with the file for publication;
   a file preparer configured to prepare the file for uploading to the common publication platform in compliance with one or more of governance, security, and change management policies; and
   a file uploader configured to upload the file to the common publication platform for publication.

2. The system of claim 1, wherein the file preparer includes a parser configured to remove worksheets that are marked to be removed from the file for publication before uploading the file to the common publication platform.

3. The system of claim 2, wherein the file preparer includes a workbook unpacker configured to unzip the file to extract individual worksheets for processing, and a workbook packager configured to zip the processed worksheets into a packaged workbook for uploading to the common publication platform.

4. The system of claim 1, wherein the receiver includes a drag-and-drop area configured to receive the file for publication by a drag-and-drop action performed by a user on the file.

5. The system of claim 4, wherein the RCD App further includes an event listener configured to recognize a file drag-and-drop event as a request to publish the file.

6. The system of claim 1, wherein the RCD App further comprises an access control list (ACL) that captures one or more governance, security, and change management policies in code.

7. The system of claim 1, wherein the RCD App further includes a data type determiner configured to determine a data type of the file received for publication.

8. The system of claim 1, wherein the RCD App further includes a notifier configured to issue status notifications at one or more steps of uploading the file to the common publication platform.

9. The system of claim 8, wherein the notifier is configured to send a transaction log of the common publication platform to a user.

10. A method for rapid deployment of content on a common publication platform, the method comprising:
    deploying a rapid content deployment application (RCD App) on a computer interfaced with the common publication platform,
    receiving, by the RCD App, a file for publication on the common publication platform;
    verifying, by the RCD App, an existence of a collaboration file on the common publication platform compatible with the file for publication;
    preparing, by the RCD App, the file for uploading to the common publication platform in compliance one or more of governance, security, and change management policies; and
    uploading, by the RCD App, the file to the common publication platform for publication.

11. The method of claim 10, wherein preparing, by the RCD App, the file for uploading to the common publication platform for publication includes removing worksheets that are marked to be removed from the file for publication before uploading the file to the common publication platform.

12. The method of claim 11, wherein preparing, by the RCD App, the file for uploading to the common publication platform for publication includes unzipping the file to extract individual worksheets for processing, and zipping the processed worksheets in a packaged workbook for uploading to the common publication platform.

13. The method of claim 10, wherein receiving, by the RCD App, a file for publication includes receiving the file in a drag-and-drop area of a user interface of the RCD App.

14. The method of claim 13, wherein receiving the file in a drag-and-drop area of a user interface of the RCD App includes utilizing an event listener to recognize a file drag-and-drop event as a request to publish the file.

15. The method of claim 10, wherein preparing, by the RCD App, the file for uploading to the common publication platform includes verifying that the file conforms to an access control list (ACL) that captures the governance, security, and change management policies in code.

16. The method of claim 10, wherein preparing, by the RCD App, the file for uploading to the common publication platform includes determining a data type of the file.

17. The method of claim 10 further comprising:
    issuing status notifications at one or more steps of uploading the file to the common publication platform.

18. The method of claim 17, wherein issuing status notifications includes sending a transaction log of the common publication platform to a user.

19. A non-transitory computer-readable medium storing instructions that when executed cause at least one processor to:
    receive a file for publication on a common publication platform;
    verify existence of a collaboration file on the common publication platform compatible with the file for publication;
    prepare the file for uploading to the common publication platform in compliance with one or more of governance, security, and change management policies; and upload the file to the common publication platform for publication.

20. The non-transitory computer-readable medium of claim 19, wherein preparing the file for uploading to the common publication platform includes removing worksheets that are marked to be removed from the file for publication before uploading the file to the common publication platform.

21. The non-transitory computer-readable medium of claim 20, wherein preparing the file for uploading to the common publication platform includes unzipping the file to extract individual worksheets for processing, and zipping the processed worksheets in a packaged workbook for uploading to the common publication platform.

22. The non-transitory computer-readable medium of claim 19, wherein receiving a file for publication includes receiving the file in a drag-and-drop area of a user interface of a computing device.

23. The non-transitory computer-readable medium of claim 22, wherein receiving the file in a drag-and-drop area of a user interface of the computing device includes utilizing an event listener to recognize a file drag-and-drop event as a request to publish the file.

24. The non-transitory computer-readable medium of claim 19, wherein preparing the received file for uploading to the common publication platform includes verifying that the received file conforms to an access control list (ACL) that captures the governance, security, and change management policies in code.

25. The non-transitory computer-readable medium of claim 19, wherein preparing the received file for uploading to the common publication platform includes determining a data type of the file.

26. The non-transitory computer-readable medium of claim 19 storing instructions that when executed cause the at least one processor to further:

issue status notifications at one or more steps of uploading the file to the common publication platform for publication.

27. The non-transitory computer-readable medium of claim 26, wherein issuing status notifications includes sending a transaction log of the common publication platform to a user.

* * * * *